United States Patent [19]

Beguin et al.

[11] Patent Number: 5,281,303

[45] Date of Patent: Jan. 25, 1994

[54] PROCESS FOR MANUFACTURING INTEGRATED OPTICAL COMPONENTS USING SILICON MASK

[75] Inventors: Alain M. J. Beguin, Vulaines S/Seine; Pascale LaBorde, Champagne Sur Seine; Jean-Claude Presotto, Chateau Landon, all of France

[73] Assignee: Corning Incorporated, Corning, N.Y.

[21] Appl. No.: 943,187

[22] Filed: Sep. 10, 1992

[30] Foreign Application Priority Data

Sep. 27, 1991 [FR] France .................. 91 11923

[51] Int. Cl.$^5$ ............................ H01L 21/00
[52] U.S. Cl. ..................... 156/653; 252/79.1; 156/643; 156/646; 156/667; 156/638; 65/30.13; 134/3
[58] Field of Search .............. 252/79.1, 79.2; 156/652, 653, 667, 638, 643, 646; 134/3; 65/30.1, 30.13, 31

[56] References Cited

U.S. PATENT DOCUMENTS

| | | | |
|---|---|---|---|
| 3,575,746 | 4/1971 | Cheskis et al. | 156/8 |
| 3,843,228 | 10/1974 | Yoshiyagawa et al. | 65/30 |
| 3,857,689 | 12/1974 | Koizumi et al. | 65/60 |
| 4,528,010 | 7/1985 | Edahiro et al. | 65/31 |
| 4,750,799 | 6/1988 | Kawachi et al. | 350/96.11 |

FOREIGN PATENT DOCUMENTS 0269996 7/1990 European Pat. Off. .
62-035524 2/1987 Japan .
62-094936 5/1987 Japan .
2-126630 5/1990 Japan .

OTHER PUBLICATIONS

"Realization of Schmidt Plates by Ion Exchange in Glass", J. L. Coutaz et al., Applied Optics, vol. 21, No. 6, Mar. 15, 1982, pp. 1066–1068.
"Fabrication and Performance of Low Loss Optical Components Made by Ion Exchange in Glass", A. Beguin et al., Journ. of Lightwave Tech., vol. 6, No. 10, Oct. 1988, pp. 1483–1487.
"Integrated Optical Waveguiding Structures Made by Silver Ion-Exchange in Glass. 2: Directional Coupler and Bends", R. G. Walker et al., Applied Optics, vol. 22, No. 12, Jun. 15, 1983, pp. 1929–1936.
"Index Profiles of Multimode Optical Strip Waveguides by Field-Enhanced Ion Exchange in Glasses", H. J. Lilienhof et al., Optics Comm., vol. 35, No. 1, Oct. 1980, pp. 49–53.
"Field-Induced Index Profiles of Multimode Ion-Exchanged Strip Waveguides", H. J. Lilienhof et al., IEEE Journ. of Quantum Elects., vol. QE-18, No. 11, Nov. 1982, pp. 1877–1883.

Primary Examiner—Tom Thomas
Assistant Examiner—George Goudreau
Attorney, Agent, or Firm—K. McNeill Taylor, Jr.

[57] ABSTRACT

A process for the production of an integrated optical circuit in a glass body by ion exchange between certain regions of the glass body and a metallic salt with the use of a mask defining the regions where the ion exchange occurs, wherein the mask comprises a layer of silicon and the mask is removed by an etching operation preceded by a cleansing operation.

7 Claims, No Drawings

PROCESS FOR MANUFACTURING INTEGRATED OPTICAL COMPONENTS USING SILICON MASK

BACKGROUND OF THE INVENTION

The invention relates to a process for the production of integrated optical components by ion exchange using a silicon mask, a process for making this mask and a process for the final removal of said mask.

The manufacture of optical waveguides in a body, in the form of a wafer or flat disk of glass, through an exchange of ions between the glass and an appropriate melted metallic salt such as a salt of Tl, Cs or Ag, is well known. This manufacture requires the use of a mask having appropriate form in order to define the region of the body in which the ion exchange will take place, that is to say the location of the optical waveguides to be formed. This can be accomplished, for example, by depositing upon the surface of the glass body which is to experience the ion exchange, a uniform mask, then, upon the mask, a pattern of appropriate polymer resist by a photolithographic technique, this pattern of resist leaving exposed some regions of the mask, removing the exposed regions of the mask, removing the resist pattern, carrying an ion exchange process, involving the regions of the surface of the body devoid of the mask, in a bath of an appropriate melted metallic salt, and then eliminating the mask. As a variant one can begin by applying an appropriate pattern of polymer resist by a photolithographic technique, this resist pattern leaving exposed some regions of the surface of the glass body; then depositing the mask and removing the parts of the mask which overlay the polymer resist material, for example, by separating this latter in a solvent in such a way as to cause only the parts of the mask covering the regions exposed by the resist to remain, after which one proceeds to the of the ion exchange process. Eventually, a second ion exchange process can be effectuated in another bath of melted metallic salt in order to "bury" the waveguide resulting from the first ion exchange. The ion exchange processes are usually assisted by an electric field.

A good mask for such manufacture must satisfy several conditions:
  it must be easy to deposit,
  it must be easy to create a pattern,
  it must have good adherence to glass,
  it must be able to resist ion exchange and,
  it must be easily removable after the ion exchange without the removal operation having any harmful effects on the glass and the regions which have undergone the ion exchange.

Numerous materials have already been proposed for the composition of the mask. We may cite the following in particular:
  aluminum, which is the masking material most commonly used, has been described with this purpose in mind in numerous articles, such as that of J. L. Coutaz et al., Applied Optics, pages 21–26, 1066, (1982).

Aluminum has, however, the defect of not resisting the process of ion exchange, in particular when the latter is prolonged, as is the case in the production of multimode components.

titanium has been advocated by several authors, see for example the article of H. J. Lilienhof et al., optics Comm., pages 35-1, 49, 1980.

In European patent No. 0 269 996, which deals with using a titanium mask, it is indicated that the titanium mask forms a thin superficial layer of ions which form a barrier in the glass, in such a way that when one desires to bury the waveguide by a second exchange of ions, it is necessary to remove this thin superficial layer of glass before hand. This is obviously an important drawback.

alumina has also been utilized as described by R. G. Walker et al., Applied Optics, page 22, 1929, (1983). Alumina gives rise to large stresses in the glass and is difficult to remove.

platinum has also been proposed. See H. J. Lilienhof et al., IEEE J. Quantum Electron, Vol., QE 18, No. 11, 1877, (1982).

Platinum suffers from being very expensive and from being difficult to remove without the use of very aggressive chemical agents. In addition it is very difficult to form a pattern in it.

silica and silicon nitride are equally mentioned in the preceding article. These materials have the drawback of requiring high deposition temperatures. Further, concerning silica, its selective cutting with respect to glass is difficult, taking into account their close chemical nature.

None of the masking materials mentioned above being fully satisfactory, there exists therefore a need in the industry for a mask which would fulfill all of the conditions set forth above.

More particularly, the invention relates to a process for the production of an integrated optical circuit within a glass body by an ion exchange between certain regions of the glass body and a melted metallic salt with the use of a mask which defines the regions where the ion exchange occurs, wherein the mask comprises a layer of silicon.

The invention also relates to a process for the deposition of a layer of masking silicon upon a glass body characterized in that the deposit of the layer of silicon is carried out while the glass body is heated to a temperature of approximately 200° to 500° C.

We will describe here only that which relates to the production of the silicon mask in and of itself and its final elimination.

The present invention is directed to a process for the removal of a layer of metallic masking from a glass body by an etching operation with the aid of a plasma of fluorinated or chlorinated gas, said layer carrying residues of salt and/or oxide, wherein the metallic masking layer is silicon, and before the etching operation one proceeds to a cleansing operation with the aid of an aqueous solution diluted with hydrochloric acid containing at most 0.40 weight % of 37% hydrochloric acid.

A further embodiment of the present invention is directed to a process for the production of an integrated optical circuit in a glass body by ion exchange wherein a silicon mask is used to define the regions where the ion exchange occurs, wherein the silicon mask is removed by reactive ion etching.

The masking layer of silicon can be deposited upon the surface of the glass body through deposition by evaporation under vacuum or by cathodic sputtering, that is to say by techniques which are well known in themselves.

However, in order to obtain a good adherence of the silicon mask to the glass body it is absolutely necessary to prepare properly the surface of the glass body before depositing the silicon upon it.

The preparation of the surface will be more or less difficult according to the duration of the ion exchange operation which the masked glass body must undergo, which itself will be a function of the type (singlemode or multimode) of the component to be produced. In the case of a singlemode component, for which the time for the ion exchange is usually about an hour, the preparation of the glass surface can consist of washing with the aid of an aqueous detergent solution followed by rinsing with deionized water and drying. In contrast, in the case of a multimode component, for which the time of ion exchange runs into tens of hours, it will become necessary to proceed to a more elaborate preparation involving a treatment by a diluted acid which aims at a very superficial attack on the glass surface in such a way as to improve the adherence of the mask. This treatment must not, however, bring deterioration of the glass surface. For example, the preparation can consist of washing with the help of an aqueous detergent solution followed by washing in a diluted acid solution, for example acetic acid, followed by rinsing with de-ionized water and drying.

The deposition of the layer of silicon on the surface of the prepared glass can be carried out, for example, by deposition by evaporation under vacuum or by cathodic sputtering. The deposition by evaporation under vacuum from a charge of silicon is preferred today. The deposition conditions are standard except for the temperature of the substrate, that is to say of the glass body, which must be as close as possible to the temperature at which the ion exchange subsequently will be carried out. In effect, the coefficient of thermal expansion of the silicon being very different from that of the glass, that is $30 \times 10^{-7}/°C$. and $100 \times 10^{-7}/°C$., if the deposition of the mask were carried out at ambient temperature, the resulting mask would crack during the ion exchange as a result of the stresses generated by the difference of the expansions. To avoid this it is necessary to deposit the silicon mask on the glass body while the latter is maintained at a temperature as close as possible to the temperature of the melted salt bath in which the ion exchange will be carried out. Usually this temperature will be situated in the range of 200° to 500° C. To this end, one will foresee the means of heating the glass body such as electrical resistance heating or infrared lamps. Given that the heating temperature of the glass body during the silicon deposition will be close to that of the glass transition temperature of the glass, one can advantageously heat the glass body from both sides to avoid the deformations which a temperature gradient could cause. After cooling to ambient temperature, the mask will be subjected to compression stress which has no harmful effect. The thickness of the layer of silicon can go from 0.1 $\mu$m to several microns. Thicknesses typically preferred are about 0.3 $\mu$m for the production of singlemode components and about 0.5 $\mu$m for the production of multimode components.

The resulting silicon layer is then coated by a photolithographic process, within a resist pattern, and next is selectively removed from the regions not covered by the resist patterns, which correspond with the optical waveguides to be produced, for example by etching with a plasma of fluorinated or chlorinated gas. One then eliminates the resist pattern by standard means, for example with the aid of a solvent or an oxygen plasma. After this operation one proceeds to the ion exchange in a bath of a melted metallic salt, for example a thallium salt, under standard conditions, this exchange aimed at replacing the $Na^+$ or $K^+$ ions of the glass with the metallic ions of the melted salt.

After the ion exchange there is occasion to proceed to the removal of the mask. An etching operation with a plasma of fluorinated or chlorinated gas is suitable for this purpose. However, before proceeding to this etching operation it is necessary to take off the residues of the salt resulting from the melted bath which would impede this etching. When the ions to be exchanged are thallium ions as is now preferred, one ordinarily uses thallium nitrate as the bath salt for the ion exchange, because of its relatively low melting point. However, during the ion exchange, thallium nitrate decomposes partially into thallium oxide which is difficult to dissolve and whose elimination therefore presents a problem. The Applicant has found that one can have recourse to an acid cleansing to eliminate the residues of the thallium, but that this cleansing presents the risk of very easily altering the waveguide created by the ion exchange, especially if it is a matter of a singlemode component, if one does not observe certain stipulations.

The present invention therefore also concerns a process for the removal of a layer of metallic mask from a glass body by a etching operation with the aid of a plasma of fluorinated or chlorinated gas, said layer bearing residues of thallium salt and/or thallium oxide, characterized in that the metallic masking layer is silicon and in that, before the etching operation, we proceed to a cleansing operation with the aid of an aqueous solution diluted with hydrochloric acid containing at most 0.40%, preferably 0.1% at most in hydrochloric weight. This treatment has the advantage of being very selective, that is to say, of permitting the elimination of the Si mask all the while provoking only a minimal attack of the glass and the waveguides created by the ion exchange (etching less than 0.1 $\mu$m).

The following non-limiting examples are given with the intent of illustrating the diverse aspects of the invention.

EXAMPLE 1

Deposit of a Masking Layer of Silicon

Before the deposition, one prepares the surface of the glass bodies by the following treatments, according to whether one wishes to produce singlemode or multimode components.

| | |
|---|---|
| Singlemode Components: | washing with a commercial aqueous detergent ("TEEPOL ®") diluted to 20 volume %, for 1 minute rinsing with de-ionized water drying |
| Multimode Components: | washing with a commercial aqueous detergent ("TEEPOL ®") diluted to 20 volume % washing in an aqueous solution of acetic acid 4 volume % at 50° C. for 1 min. rinsing in de-ionized water drying |

One brings about the deposition of the Si layer by evaporation under vacuum with an electron gun starting with a charge of Si in a LEYBOLD L560 machine.

One loads eight glass bodies at a time upon a circular support which one places above the vacuum enclosure.

The bodies are initially protected by masking.

One generates the vacuum in the machine to a residual pressure of $5 \times 10^{-7}$ millibars, then one heats the glass body to 340° C. with a temperature increase of 4° C./minute. The pressure just before the deposit is $5 \times 10^{-6}$ millibars. One places the electron gun under pressure, one melts the silicon charge and one regulates the power in order to attain a deposition speed for the silicon of 50Å/sec. One then opens the masking protecting the bodies which are to be coated. One carries out the deposition during 1 min. for singlemode samples (thickness of Si: 0.3 μm) and during 1 min. 40 sec. for multimode samples (thickness of Si: 0.5 μm). After the deposition one leaves the samples to cool at a rate of 2° C./min., one places the samples back into contact with the air when they have cooled to 100°–150° C., then one takes them out of the vacuum enclosure.

EXAMPLE 2

Removal of the Mask-Implementation Method No. 1

Singlemode and multimode samples having undergone an ion exchange in a melted bath of thallium nitrate have been subjected to the following operations:

A. The removal of residues of thallium nitrate and oxide:

cleansing for 1 minute with the aid of an aqueous solution of a commercial detergent ("TEEPOLO ®") diluted to 20 volume %
rinsing in de-ionized water
cleansing for two minutes in aqueous solution of 1 weight % of 37% hydrochloric acid (at 20° C.)
rinsing in de-ionized water
drying B. Removal of the mask in a plasma of $CF_4 + 4\% O_2$ Apparatus utilized: Plasmafab 505 from ETA Electrotech. It is a matter of an apparatus of the type called "barrel" (cylinder).

Etching conditions:
pressure: 26 Pa (200 millitorrs)
power: 200 watts
time: 3 min. (singlemode components) or 4 min. (multimode components)

C. Final cleansing (removal of the last traces of thallium compounds)

cleansing for 5 seconds in an aqueous solution of 0.2 weight % of 37% hydrochloric acid (at 20° C.)
rinsing in de-ionized water
drying The multimode samples obtained were of a very good quality. The results obtained with the singlemode samples were less fit because of the fact that this type of component is more sensitive to chemical attack which led the Applicant to focus on a less aggressive implementation method better adapted to the production of singlemode components.

EXAMPLE 3

Removal of the Mask - Embodiment No. 2

Singlemode samples having undergone an ion exchange in a melted bath of thallium nitrate have been subjected to the following operations:

A) The same as in example 2, if the cleansing in diluted hydrochloric acid has lasted only 1 minute and if the concentration of the solution was 0.25 weight % of 37% HCL B) Removal of the mask in a plasma of $SF_6$.

The apparatus utilized: NE 110 of NEXTRAL This is an apparatus of the type called RIE (for "Reactive Ion Etching") permitting an excellent control of the demasking.
output: 15 $cm^3$/min under standard conditions of temperature and pressure
pressure: 6.5 Pa (50 millitorrs)
power: 30 watts
extent: approximately 120 seconds (detection of the completion of the etching by reflectometry)

C) Final cleansing
cleansing for 1 minute with the aid of an aqueous solution of commercial detergent ("TEEPOLO ®") at 50 volume %
rinsing in de-ionized water
drying The singlemode samples thus treated were perceptibly free of attack affecting the waveguides.

It goes without saying that the embodiments described are only examples and that one could modify them, especially by the substitution of equivalent techniques, without going beyond the bounds of the invention.

We claim:

1. A process for the removal of a layer of metallic masking from a glass body by an etching operation with the aid of a plasma of fluorinated or chlorinated gas, said layer carrying residues of salt and/or oxide, wherein the metallic masking layer is silicon, and before the etching operation one proceeds to a cleansing operation with the aid of an aqueous solution diluted with hydrochloric acid containing at most 0.40 weight % of 37% hydrochloric acid.

2. The process of claim 1, wherein the concentration of the diluted aqueous solution of hydrochloric acid is at most 0.1 weight %.

3. The process of claim 1 wherein said glass body has been subjected to an ion exchange process prior to said etching operation.

4. The process of claim 1 wherein said salt and/or oxide comprises thallium salt and/or thallium oxide.

5. A process for the production of an integrated optical circuit in a glass body by ion exchange wherein a silicon mask is used to define the regions where the ion exchange occurs, wherein the silicon mask is removed by reactive ion etching.

6. The process of claim 5 wherein the reactive ion etching comprises etching with a plasma of $SF_6$.

7. The process of claim 5 wherein said silicon mask carries residues of thallium salt and/or thallium oxide.

* * * * *